No. 865,168. PATENTED SEPT. 3, 1907.
J. M. DOHAN.
MANUFACTURE OF PULP AND PAPER.
APPLICATION FILED FEB. 9, 1907.

3 SHEETS—SHEET 2.

WITNESSES:
Jas. C. Denny Jr.
Robt R Kitchel.

INVENTOR
Jos. M. Dohan
BY
Chas. N. Butler
ATTORNEY.

No. 865,168.

PATENTED SEPT. 3, 1907.

J. M. DOHAN.
MANUFACTURE OF PULP AND PAPER.
APPLICATION FILED FEB. 9, 1907.

3 SHEETS—SHEET 3.

WITNESSES:
Jos. G. Denny Jr.
Robt R Kitchel

INVENTOR
Jos. M. Dohan
BY
Chas. N. Butler
ATTORNEY.

UNITED STATES PATENT OFFICE.

JOSEPH M. DOHAN, OF DARLINGTON, PENNSYLVANIA.

MANUFACTURE OF PULP AND PAPER.

No. 865,168.

Specification of Letters Patent.

Patented Sept. 3, 1907.

Application filed February 9, 1907. Serial No. 356,517.

*To all whom it may concern:*

Be it known that I, JOSEPH M. DOHAN, a citizen of the United States, residing at Darlington, in the county of Delaware and State of Pennsylvania, have invented certain Improvements in the Manufacture of Pulp and Paper, of which the following is a specification.

My invention is more particularly a reclaiming system whereby water and solid matter discharged therewith in the treatment of the pulp and the formation of the paper are returned and reincorporated in the process of manufacture in a continuous cyclic operation.

In the usual operations, large volumes of water are employed and wasted, at considerable expense and inconvenience, and from rain or other causes the supply is liable to contain objectionable matter necessitating filtration or otherwise affecting the product injuriously. Operations have been proposed for separating pulp from white water and returning it for incorporation in the paper web but such operations have reclaimed only a part of the valuable matter contained in the discharged water and necessitated the manipulation of the reclaimed pulp prior to incorporating it in the paper.

In the preferred practice of my invention, the water is continuously circulated, continuously used, and continuously filtered through the paper web, so that there is no necessary loss of water excepting by evaporation, very little raw water is required, and there is practically no deleterious matter from the water. The bulk of the solid matter discharged with the water in the treatment of the pulp and the formation of the paper is precipitated, and carried back suspended in the water for direct incorporation in the paper web, while any valuable matter not so separated is carried by the remaining clarified water to the pulp in the beaters or other stage of the operation. Fiber, chemicals and clay, valuable for use in the product and usually lost, are recovered, and incorporated in the product.

The foregoing characteristic features together with further advantages of the system will more fully appear by reference to the following description and the accompanying drawings of the invention.

Figure 1:
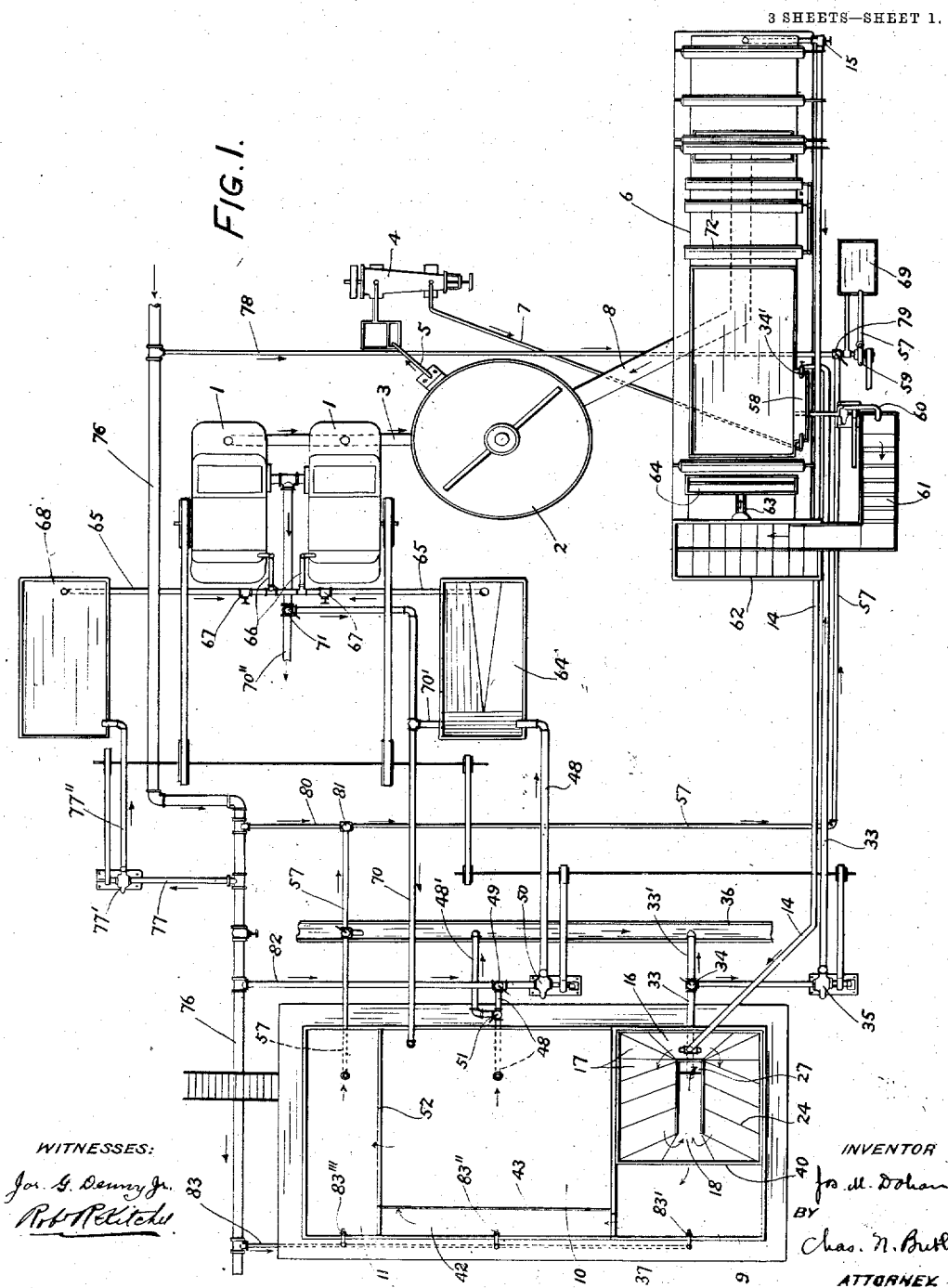
Figure 2:
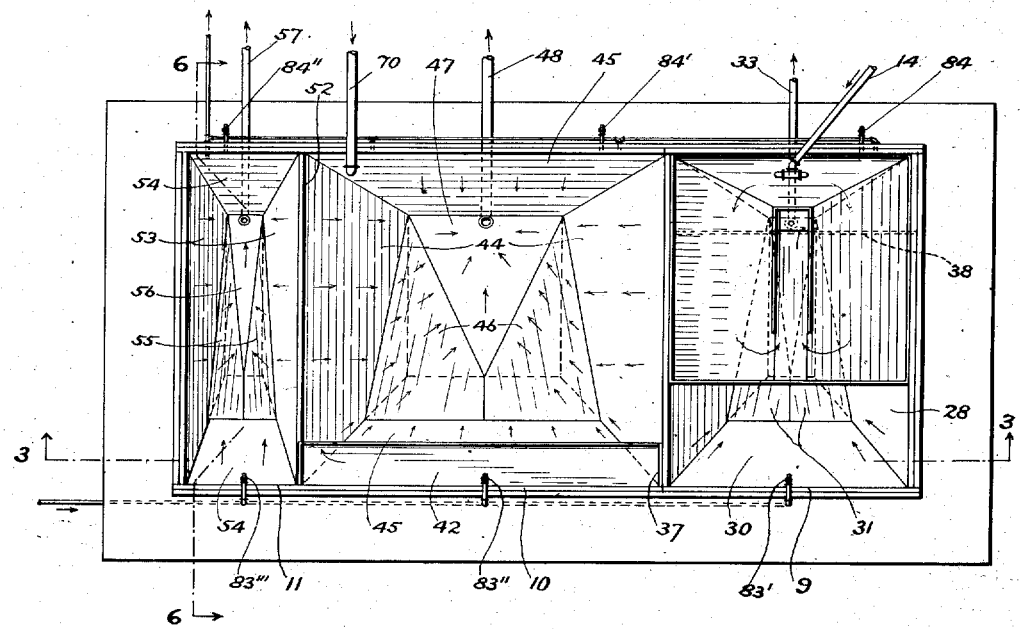
Figure 3:
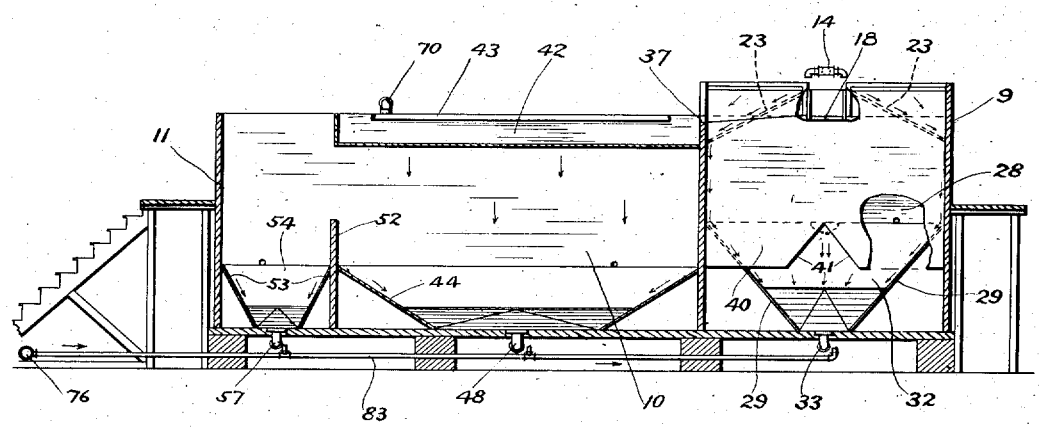
Figure 4:
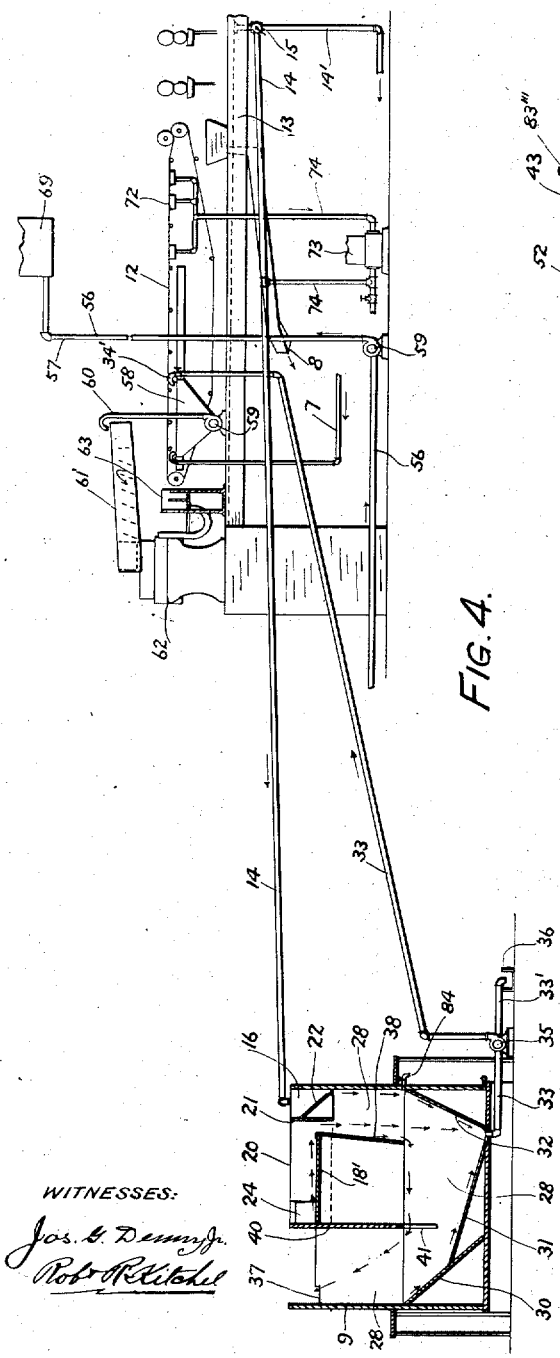
Figure 6:
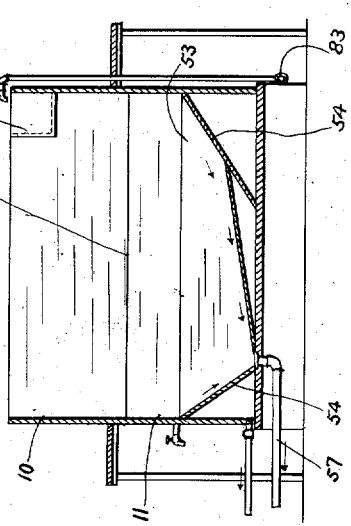
Figure 5:
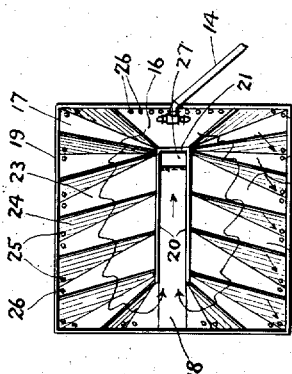

In the drawings, Figure 1 is a diagrammatic plan view in illustration of my invention, details of the apparatus being omitted; Fig. 2 is a plan view of the concentrating, segregating and storing tanks with parts omitted to more clearly show the interior construction; Fig. 3 is a vertical sectional view taken on the line 3—3 of Fig. 2, with parts broken away to show interior details; Fig. 4 is a sectional side elevation showing the interior details of the primary tank and a paper making machine connected therewith; Fig. 5 is a plan view showing baffling means of the primary tank; and Fig. 6 is a vertical sectional view on the line 6—6 of Fig. 2.

The system, as illustrated, is applied to usual forms of pulp and paper machinery comprising the beaters 1, the stuff chest 2 with which the beaters communicate by the conduit 3, the refining engine 4 connected with the stuff chest by the duct 5, and the Fourdrinier machine 6 connected with the refining engine by the conduit 7 and with the stuff chest by the conduit 8. In circuit with this apparatus, are the concentrating, segregating and storing means, comprising the connected compartments or tanks 9, 10 and 11.

The white water or liquid with the solid and other valuable matter, discharged from the traveling wire apron 12 in forming the paper web and collected by the sluice 13, is carried through the pipe 14, under control of the two way valve 15, to the tank 9, the branch pipe 14' providing means for otherwise discharging liquid from the sluice when it is not desired in the tank as in cleaning. This tank has in the top thereof the chambers 16, 17 and 18 formed by the outer walls 19, the inner walls 20 and 21, the bottoms 22 and 23, and the riffle boards 24; the bottoms being inclined downward from the inner to the outer walls and the riffle boards being inclined forward at their outer and lower portions so as to form with the bottoms and outer walls acute trihedral angles, projecting in the direction of flow from the chamber 16 through the chambers 17, and thence to the chamber 18. Holes 25 and 26 are formed in the lower corners of the riffle boards and the outer portions of the bottoms for the passage of water and valuable contents.

The pipe 14 carries the water with its burden of valuable contents from the sluice 13 into the chamber 16, whence there is flow over the riffle boards 24, through the holes 25 and 26, through the successive compartments 17 and 18, and through the vertical opening 27 at the termination of the channel like part of the chamber 18 formed by the walls 20, the bottom 18' of the channel being slightly inclined to aid the flow. The baffling effect of the riffle boards and slight suction through the openings 25, 26, and 27, together with the comparatively high specific gravity of the solid matter with relation to the water by which it is carried, causes more or less of such matter to settle from water passing through the openings 26 and 27 into the well or chamber 28. This chamber has inclined bottom sections 29, 30, 31 and 32 pitched beyond the angle of repose of the fiber and forming a basin discharging at its lowest point through a pipe 33. A pump 35 in this pipe, governed by the controlling valve 34', governs the suction and withdrawal of water containing concentrated solids for use in the system, a branch pipe 33', controlled by the valve 34, permitting cleansing of the compartment by discharge of the contents into the waste trough 36. Water, which fills the chamber 28 and is in a comparatively quiescent state by reason of its volume, flows therefrom, by a current having the direction of arrows shown, through the weir 37. The flow is baffled to further separate solids by the aprons 38, 39 and 40, the latter having the notch 41 therein through which the current passes. The weir 37 discharges the water, with the small amount of solid matter and chemicals in solution which it contains, into the trough 42, where it may be treated with alum or other clarifying agent if required, and from this trough the water passes by the weir 43 into the large storage compartment 10. Here the subsidence of further solid matter takes place, the deposit being collected in the basin formed by the sectional bottoms 44, 45, 46, and 47, having inclinations sharper than the angle of repose. The lowest point of this basin discharges through a pipe 48, the flow through which for purposes of utilization is controlled by the pump 50; while the tank is being cleansed the contents may be discharged by the branch pipe 48′ (controlled by the two-way valve 51) discharging to the trough 36. Water in the chamber 10 flows over the vertical baffle or wall 52 into the chamber 11 with the bottom sections 53, 54 and 55, having inclinations sharper than the angle of repose, these sections forming a basin having an outlet from its lowest part through the pipe 57 by which practically clarified water is returned for use. The pipe 33, containing the valve 34′, carries the water with the segregated solids concentrated to the degree desired to the vat 58. Here it mixes with the stock flowing from the refining engine 4 by the pipe 7, and is carried by the pump 59 and the pipe 60 to the riffle board system 61, thence to the screens 62, and the flooding apparatus 63, by which it is delivered to the wire 12 and completes a circuit. The pipe 48 carries water to the beater tank 64 with a bottom inclined to an outlet by way of the pipe 65 having branches 66 leading to the beaters 1 and valves 67 for controlling the flow thereto by which its circuit is completed. The pipe 65 is also connected with the wash water tank 68 for supplying raw water to the beaters when desired. The pipe 57, having the two-way valve 79 and the pump 59 therein, carries the clarified water from the chamber 11 to the machine water tank 69, which distributes it by the usual system of ducts to the paper machine for the usual uses such as supplying the shower pipes and cleansing, whence it finds its way to the sluice 13, by which its circuit is completed. Water discharged at the ends of the beater washing cylinders may be carried by the pipe 70 to the tank 10, excepting where such water is undesirable in the system when it is discharged through the branch 70″ controlled by the two way valve 71. The overflow from the tank 64 is conducted by the branch 70′ to the pipe 70 and thence to the tank 10.

It is to be understood that not only the water discharged from the wire 12 to the sluice 13, but also all water collected from the paper web, as through the suction boxes by the suction pump 73, is carried into the system for recirculation by the pipe 74 connected with the pipe 14.

In order that raw water may be brought into the system when desired, to effect cleansing, or to permit of repairs, the raw water main 76 is connected by the pipe 82 and the two-way valve 49 with the pump 50, through which the raw water may be introduced into the system in substitution of the purified water, from which it passes through the pipe 48 to the tank 64, and thence through the pipe 65 to the beater system, after which the operation proceeds as in the usual practice, and in the manner hereinabove described. Similarly, and for similar purposes, from the raw water main 76 by the pipe 78 controlled by the two-way valve 79, raw water is by the pump 59 introduced into the machine tank 69, and thence into the system by the usual practice not shown on the drawings. At such times the flow through the drain 13 by means of the two-way valve 15 is diverted to waste by the discharge pipe 14′.

For cleansing purposes, the pipe 83 leads from the raw water main 76 to the several compartments which it supplies by means of branches containing the controlling valves 83′, 83″ and 83‴. For the purpose of restoring the deficiency occasioned by leakage and the evaporation of the water from the moist paper web, the controlling valve 83″ is allowed to remain open sufficiently to restore the small amount of water lost in operation.

In my system I do not reclaim the water used in washing rags as this is polluted. The separate raw water supply for this purpose is indicated in my drawing. From the main 76 the raw water is conducted by the pipe 77 to the pump 77′ by which it is discharged through the pipe 77″ into a washer tank 68, from which it may be distributed to washing engines by appropriate means, not shown on my drawings, as in the usual practice.

Cocks 84, 84′, and 84″ permit the contents of the compartments 9, 10 and 11 to be tested to determine the efficiency of the operations and the condition of the contents of the compartment, in order that the suction of the pump 35 may be regulated accordingly.

The comparatively small amount of raw water that is required for addition to the system may be filtered with little expense if required but this would not be necessary generally as by dilution a considerable amount of impurity in the admitted water would be insignificant when mixed with the whole, and would be cleansed quickly by use.

The extent of the saving of water and the advantage of avoiding the use of impure water is indicated by the fact that the beating and paper-making ordinarily require from each paper machine unit from three hundred thousand to five hundred thousand gallons of water per day of twenty-four hours, while my system need not contain more than twenty to thirty thousand gallons per machine unit, which is passed through the paper web from fifteen to twenty-five times per day and the loss of water in operation requiring replacement is but about two pounds of water per pound of paper manufactured.

The paper made by this mode of operation, by reason of the reincorporation of solid matter and the use of practically pure water, has a finer texture and finish and greater freedom from specks than obtain in products resulting from the usual methods of operation.

Having described my invention, I claim:—

1. In the manufacture of pulp and paper, the method which consists in collecting the bulk of the water and solid matter discharged in the operation of forming the web, concentrating the solid matter and separating it with the water containing it from the water from which it is concentrated, and returning and reincorporating at different stages in the process of manufacture the concentrated solid matter with the water containing it and the water from which said solid matter is concentrated.

2. In the manufacture of pulp and paper, the method which consists in collecting the bulk of water and solid matter discharged from fibrous material in process of forming a web, circulating and baffling said water with precipitation of solid matter, flowing off the water from which said solid matter is precipitated and returning it for reincorporation in the treatment of the fibrous material in process of manufacture, and flowing off the precipitated solid matter with the water containing it for separate reincorporation in the process of treating said fibrous material.

3. In the manufacture of pulp and paper, the method which consists in collecting substantially all the water and solid matter discharged from fibrous material in forming a web, circulating and baffling said water with precipitation of solid matter, flowing off the partially clarified water at a higher level and water containing the precipitated matter at a lower level, collecting said partially clarified water and effecting precipitation of solid matter contained therein, and returning the clarified water and the solids separated therefrom by different courses for separate incorporation in the treatment of said fibrous material.

JOSEPH M. DOHAN.

Witnesses:
KATHERINE E. MOORE,
EDWARD B. REEDER,
JOHN F. NOLAN.

---

Correction in Letters Patent No. 865,168.

It is hereby certified that in Letters Patent No. 865,168, granted September 3, 1907, upon the application of Joseph M. Dohan, of Darlington, Pennsylvania, for an improvement in "the Manufacture of Pulp and Paper," an error appears requiring the following correction: The drawings forming a part of said patent should have been corrected, as directed by the patentee in an amendment duly filed before the issue of patent, as follows: On Figure 1 the refining engine indicated by reference numeral 4 should appear in the reverse position; and that the said Letters Patent should be read with this correction therein that the same may conform to the record of the case in the Patent Office.

Signed and sealed this 29th day of October, A. D., 1907.

[SEAL.]

E. B. MOORE,
*Commissioner of Patents.* water containing it from the water from which it is concentrated, and returning and reincorporating at different stages in the process of manufacture the concentrated solid matter with the water containing it and the water from which said solid matter is concentrated.

2. In the manufacture of pulp and paper, the method which consists in collecting the bulk of water and solid matter discharged from fibrous material in process of forming a web, circulating and baffling said water with precipitation of solid matter, flowing off the water from which said solid matter is precipitated and returning it for reincorporation in the treatment of the fibrous material in process of manufacture, and flowing off the precipitated solid matter with the water containing it for separate reincorporation in the process of treating said fibrous material.

3. In the manufacture of pulp and paper, the method which consists in collecting substantially all the water and solid matter discharged from fibrous material in forming a web, circulating and baffling said water with precipitation of solid matter, flowing off the partially clarified water at a higher level and water containing the precipitated matter at a lower level, collecting said partially clarified water and effecting precipitation of solid matter contained therein, and returning the clarified water and the solids separated therefrom by different courses for separate incorporation in the treatment of said fibrous material.

JOSEPH M. DOHAN.

Witnesses:
KATHERINE E. MOORE,
EDWARD B. REEDER,
JOHN F. NOLAN.

---

Correction in Letters Patent No. 865,168.

It is hereby certified that in Letters Patent No. 865,168, granted September 3, 1907, upon the application of Joseph M. Dohan, of Darlington, Pennsylvania, for an improvement in "the Manufacture of Pulp and Paper," an error appears requiring the following correction: The drawings forming a part of said patent should have been corrected, as directed by the patentee in an amendment duly filed before the issue of patent, as follows: On Figure 1 the refining engine indicated by reference numeral 4 should appear in the reverse position; and that the said Letters Patent should be read with this correction therein that the same may conform to the record of the case in the Patent Office.

Signed and sealed this 29th day of October, A. D., 1907.

[SEAL.]

E. B. MOORE,
*Commissioner of Patents.*

Correction in Letters Patent No. 865,168.

It is hereby certified that in Letters Patent No. 865,168, granted September 3, 1907, upon the application of Joseph M. Dohan, of Darlington, Pennsylvania, for an improvement in "the Manufacture of Pulp and Paper," an error appears requiring the following correction: The drawings forming a part of said patent should have been corrected, as directed by the patentee in an amendment duly filed before the issue of patent, as follows: On Figure 1 the refining engine indicated by reference numeral 4 should appear in the reverse position; and that the said Letters Patent should be read with this correction therein that the same may conform to the record of the case in the Patent Office.

Signed and sealed this 29th day of October, A. D., 1907.

[SEAL.]

E. B. MOORE,
*Commissioner of Patents.*